(12) United States Patent
Thomson et al.

(10) Patent No.: US 7,618,221 B2
(45) Date of Patent: Nov. 17, 2009

(54) CORNER AND BULKHEAD PROTECTOR

(75) Inventors: Stuart H. Thomson, Downers Grove, IL (US); Brian E. O'Neill, Hanover, PA (US)

(73) Assignee: Holland, L.P., Crete, IL (US)

( * ) Notice: Subject to any disclaimer, the term of this patent is extended or adjusted under 35 U.S.C. 154(b) by 0 days.

(21) Appl. No.: 10/595,267

(22) PCT Filed: Sep. 30, 2004

(86) PCT No.: PCT/US2004/032565

§ 371 (c)(1),
(2), (4) Date: Apr. 3, 2006

(87) PCT Pub. No.: WO2005/032955

PCT Pub. Date: Apr. 14, 2005

(65) Prior Publication Data

US 2007/0110536 A1  May 17, 2007

Related U.S. Application Data

(60) Provisional application No. 60/507,739, filed on Oct. 1, 2003.

(51) Int. Cl.
*B60P 7/08* (2006.01)
(52) U.S. Cl. .................... 410/99; 410/41; 410/155
(58) Field of Classification Search .................. 410/39, 410/40, 41, 99, 118, 155; 206/453, 586; 248/345.1
See application file for complete search history.

(56) References Cited

U.S. PATENT DOCUMENTS

| 4,525,113 | A | | 6/1985 | Colman |
| 5,518,348 | A | | 5/1996 | Tucker |
| 5,584,623 | A | | 12/1996 | Nadherny |
| 5,980,173 | A | * | 11/1999 | Danekas et al. ............ 410/99 |

OTHER PUBLICATIONS

International Search Report for PCT application PCT/US2004/32565 filed Sep. 10, 2004, date of completion Apr. 20, 2005.

* cited by examiner

*Primary Examiner*—Stephen Gordon
(74) *Attorney, Agent, or Firm*—Barnes & Thornburg LLP

(57) ABSTRACT

A corner protector and bulkhead protector for a cargo carrying vehicle such as a rail car are formed to have deep channels or corrugations that provide for both increased strength and rigidity while also providing support for load restraining web straps.

3 Claims, 2 Drawing Sheets

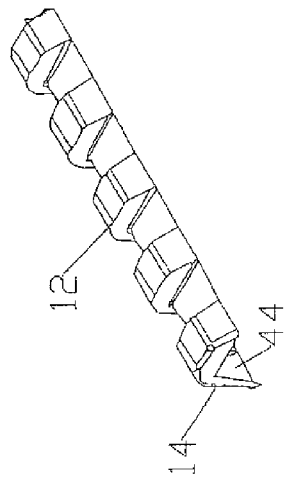
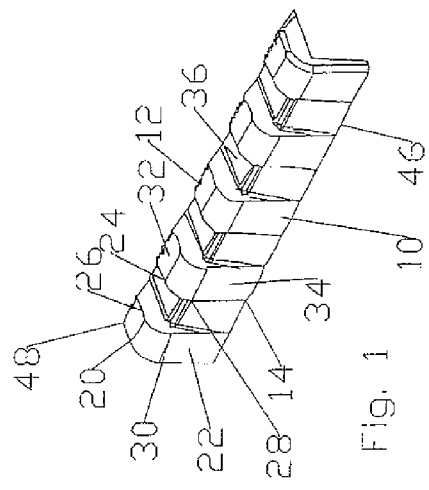
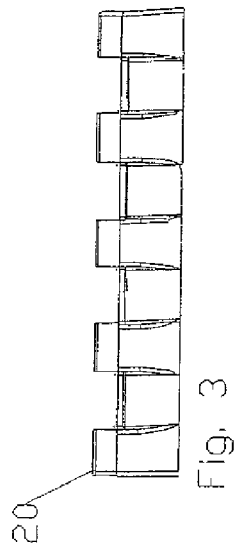
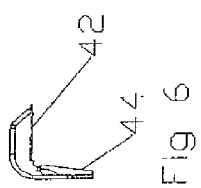
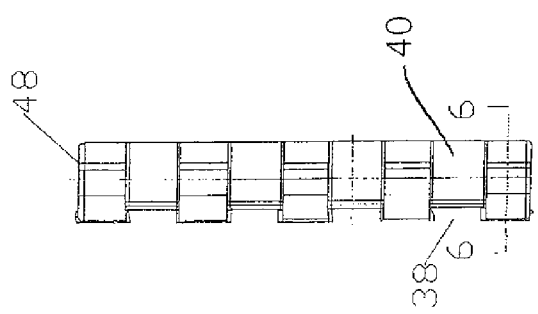
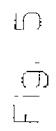

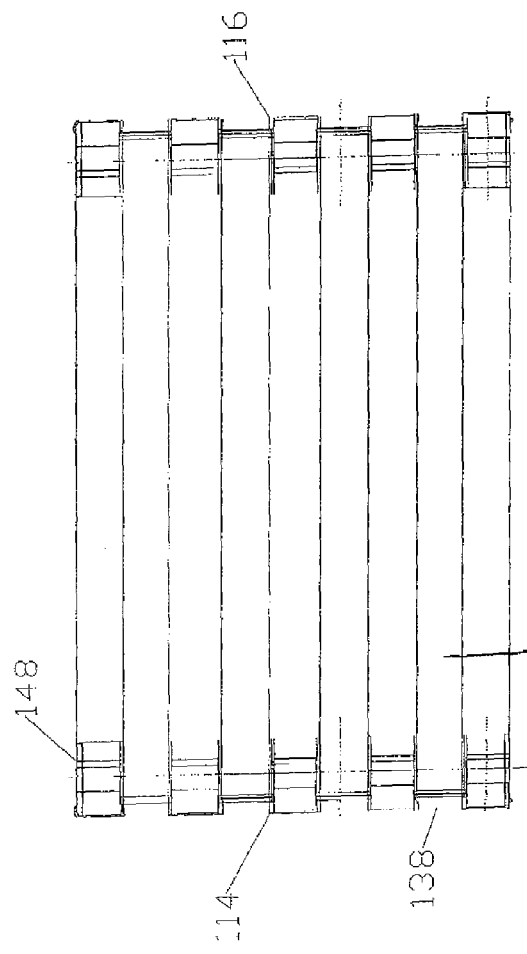
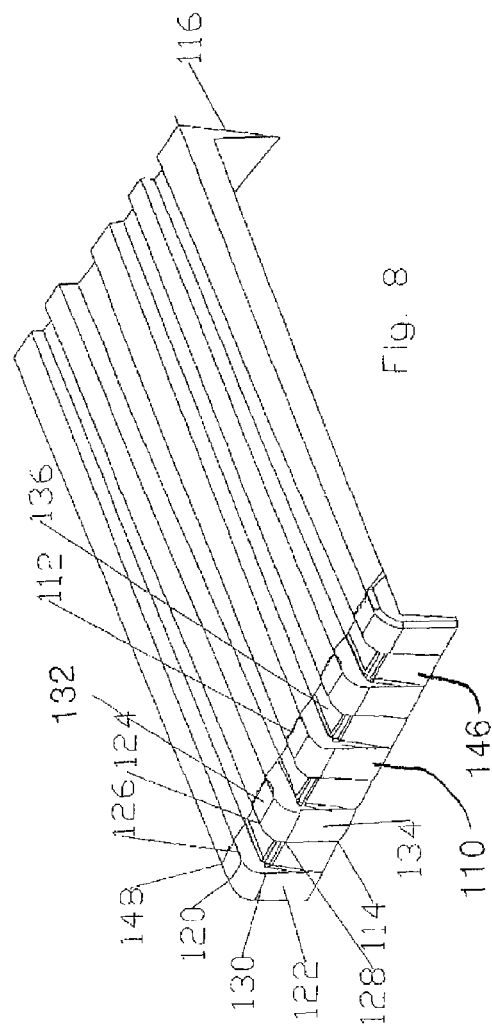
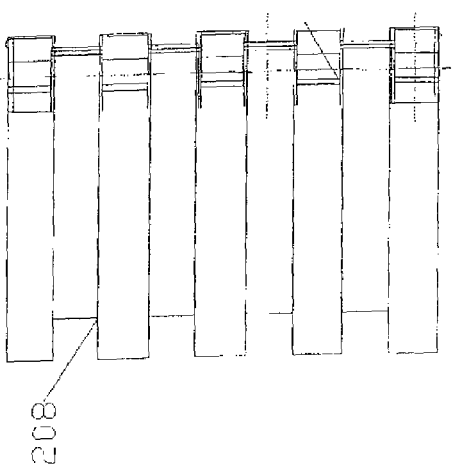

CORNER AND BULKHEAD PROTECTOR

BACKGROUND OF THE INVENTION

1. Field of the Invention

There are two basic products embodiments of this invention. The first is a corner protector and the other is "Bulkhead." These items have unique design and use.

The individual designs included here were developed by, Applications Engineer Contractor for McClarin Plastics and myself giving commercial requirements. McClarin Plastics has given us permission to apply for patents on these products.

2. Description of Related Art

Generally, when loads are secured in transit, particularly with load securement straps such as that taught in U.S. Pat. Nos. 6,422,794 ("Cargo Snugger Strap And Hook Mechanism") and 6,494,651 ("Railcar Anchor And Load Snugger Arrangement") which are both incorporated by reference as if fully set forth herein, there is a concentration of mechanical loads on the locations where the straps contact the cargo. Spreading the mechanical load with a reinforcement or stronger material, whether wood, corrugated cardboard, plastic angles or sheets or the like, has been long used. "Angles" made of wood, cardboard, steel, fiberboard, aluminum, fiberglass, plastic, rubber, etc are often to use to protect loads from damage done by chains, wires, rope, steel, banding, web straps, or other restraint method to prevent load shifting in transit. Similarly, a variety of ways to temporarily support an untensioned securement strap have been used, including a variety of hooks, eyes and cords.

Current corner protectors of aluminum and fiberglass while lightweight have smooth surfaces. When used in a vertical position with a web strap, upon release of strap tension the corner protector could drop to the floor of the car. Small ribs do not solve the problem because these prior art corner protectors could still slip. Extra costly labor was required to load and unload web strap equipment with these prior art corner protectors.

In the plastic molding field, McClarin Plastics, Inc. of Hanover, Pa. is believed to be assignee of on the vacuum forming plastic to form pick-up truck beds with deep corrugations to hold 2"×4" wood blocking.

Deep corrugated plastic shapes in the configuration taught in this invention enable both cargo protection and ease of use of snugger arrangements.

SUMMARY OF INVENTION

The corner protectors for securing loads, use "angles" to protect loads from damage done by primarily web straps, to prevent load shifting in transit. The use of "ribbing" helps strengthen the corner protector and also positions the web straps. Our use of "ribbing" on our corner protector is unique. It is intended that our corner protector be used with our "snugger" web strap system. This use with web strap of "deep" corrugations or ribs is believed to be unique. By using a web strap with "ratchet" that takes up "slack" in the web strap we have added an object that may be an interference on the load face. It is our goal to "shield" or protect this ratchet from the load. Thus a "rib" 3" deep and at least 7" wide was incorporated into the design so that on a 4" web strap application, the ratchet could be placed near the corner of the load. Placing a load of boxes that make contact with the smooth "rib" surface and not the irregular surface of the ratchet which could cause potential snagging or rip the packages.

BRIEF DESCRIPTION OF DRAWINGS

FIG. 1 is an outside corner perspective view of the corner protector

FIG. 2 is an inside corner perspective view of the corner protector

FIG. 3 is a side elevational view of the corner protector
FIG. 4 is a side elevational view of the corner protector FIG. 4 is a front elevational view of the corner protector FIG. 5 is a sectional view of the corner protector FIG. 6 is a sectional view of the corner protector FIG. 7 is an elevational view of the bulkhead protector.

FIG. 8 is a perspective view of the bulkhead protector.

FIG. 9 is an elevational view of an alternative bulkhead protector.

DESCRIPTION OF PREFERRED EMBODIMENTS

Corner protectors 10 for securing loads, are formed having a front panel 12 and side panel 14 which define a greater than perpendicular "angle" to fit and be drawn tight over the corners of loads or cargo to protect the loads or cargo from damage done by primarily web straps and to prevent load shifting in transit. Front ribs 20 and side ribs 22 strengthen the corner protector. Ribs 20, 22 have walls 24, 26 and 28, 30 respectively, and faces 32, 34 respectively. Floors 36, in conjunction with walls 24, 26, 28, 30, define channels 38, 40 on the respective panels 12, 14. Channels 38, 40 and specifically walls 24, 28 support and position the web straps.

By using a web strap with "ratchet" that takes up "slack" in the web strap we have added an object that may be an interference on the load face. Channels 38, 40 are preferably 3" deep and at least 7" wide so that on a 4" web strap application, the ratchet could be placed near the corner of the load. Placing a cargo of boxes that make contact with the smooth underside surfaces 42, 44 of the front 12 and side 14 panels respectively. Underside surfaces 42, 44 provide a smoother surface than the irregular surface of the ratchet which could cause potential snagging or rip the packages.

The angle between panels 12, 14 spaces the trailing edge 46 of panel 14 slightly outwardly from a typical cargo container side wall (not shown) which would extend rearwardly generally perpendicularly from the front wall of the cargo container. This spacing provides clearance for fitting, some resilience against tightening a strap should the line of tension of the strap be directed more rearwardly, and some outward pressure against a strap which is anchored to a railcar side wall. These traits provide applicability of the corner protector to different cargo situations.

As you will note in the photo report of the first test load, the ratchet was not located at the corner of the load but in the middle. This may be its use also. It allows "void" fillers to be applied between two paired corner protectors using the depth of the "ribs" as a guide to proper thickness or void filler.

It is not the intent of this design to limit itself to 4" web straps and corresponding ratchets, but to any web strap, banding, or method that has a tensioning device like a ratchet included.

The use of deep corrugation "rib" design with ribs 20, 22 and channels 38, 40 permits release of the ratchet and slack in the web strap. This corner protector is still held in place by the web straps because the "ribs" reduces dropping of untensioned straps.

Another feature of the corner protector is the option to add an upper ledge 48 to the corner protector to hold it in place on the cargo until the web strap or other load securement method is put in place.

The preferred embodiment has 8" wide panels 12, 14 on two sides with 3" deep×7" wide ribs as a minimum. The length (or height) of corner protectors 10 is preferably 46" to 60". Variations in leg size as well as "rib" depth and width are possible. There is no limit to the number of ribs or spacing.

Another embodiment is a full width bulkhead 110. This is used for two different reasons.

The first reason is where a payload in a railcar, as example, is split into multiple compartments. Typically this is four compartments with two in each end. In the past where web strapping and ratchets were used with a "net", it was necessary to mount the ratchets into the railcar wall.

Unfortunately newer railcar construction does not easily permit installation of the ratchets on the car walls. Therefore they must be put on the front of the load face. After the first load compartment is secured, it is necessary to place the second load section against it and the protecting ratchet. This sets the load up for possible damage from the ratchet.

A solution is to use a corrugated "ribbed" bulkhead 110 against the first load and secured by web straps and ratchet placed inside the protective "groove" or "trough" formed by the ribs. The ribs and channels generally correspond to those described with respect to the corner protector 10. Thus, bulkhead protector 110 has front panel 112 with two side panels 114, 116. Panel 112 has front ribs 120 and side ribs 122 on each side 114, 116. Walls 124, 126 and 128, 130, respectively leaving faces 132, 134 and floors 136, which define channels 138, 140 between them.

Underside surfaces 142, 144, trailing edge 146 and upper ledge 148 provide functions analogous to the corresponding elements of the corner protector 10. The ribs 120, 122 support the next load by supplying space of approximately 4" between compartments. The ribs 120, 122 offer enough support for the load over approximately 40 to 50 percent of the surface area. This is particularly better than a "net" which typically supports less than 25 percent of the surface area. This first design also incorporates corner protectors on each side to prevent strap "cutting" and additional rigidity. This bulkhead 110 performs many of the same functions as the load restraining system taught in Published Application No. 2003-012903 (which is incorporated by reference) by breaking the load into compartments and eliminating most side void filler dunnage. This previous bulkhead is a "fixed" width bulkhead approximately 96" wide with various height options.

A second bulkhead version FIG. 9 is a "telescoping" or two piece type. It utilized two halves that fit together either in a locking method or "sliding" slots 208. This variation performs the same function as the "fixed" bulkhead except it has two advantages. First, it allows for load width variation. Example loads 8' to 9'-6" wide could be handled with this device. A second advantage is for return movements; the device can be collapsed to a smaller size (stackable) such as 60" wide instead of 96" wide for placing it on a smaller pallet.

Another variation of the above devices is a unit with less weight. This could reduce the weight of the fixed bulkhead (120 pounds for a 48" high piece) or telescoping bulkhead (135 pounds for a 48" high piece) by placing holes or slot at critical locations that reduce weight by ⅓ or more. Designs of this sort would be matched to bagged or boxed loads so as not to damage the load. Weight reduction would be aimed at increased worker safety by reducing lifting weight by two loaders to fewer than 50 pounds per person.

The material used in the preferred embodiment is plastic that is heated and vacuum formed or by other means. Other suitable plastics are usable.

The invention claimed is:

1. A corner and bulkhead protector for a cargo carrying vehicle comprising;
    a first cargo engaging surface;
    a second cargo engaging surface;
    said first cargo engaging surface adapted to engage a front face of an item of cargo;
    said second cargo engaging surface adapted to engage a side of an item of cargo;
    a first strap engaging surface;
    a second strap engaging surface;
    said first strap engaging surface being opposite said first cargo engaging surface, defining a first wall therebetween;
    said second strap engaging surface being opposite said second cargo engaging surface, and defining a second wall therebetween;
    a first strap supporting surface;
    a second strap supporting surface;
    said first strap supporting surface extending substantially perpendicularly outwardly from said first wall;
    said second strap engaging surface being opposite said second cargo engaging surface and extending substantially perpendicularly outwardly from said second wall;
    said first and second strap supporting surfaces forming a continuous and coplanar strap support member;
    first and second vertical webs extending upward from said first and second strap supporting surfaces in planes perpendicular to said walls;
    first and second horizontal webs extending inward from said first and second vertical webs in a plane perpendicular to said strap support member;
    a combination of ones of said walls, supporting surfaces, and webs forming a first corrugation;
    a second corrugation corresponding in form to said first corrugation, formed and arranged to extend said protector over a selected portion of a corner of a cargo;
    said corrugations providing for both increased strength and rigidity and providing support for load restraining web straps.

2. The corner and bulkhead protector of claim 1, further comprising:
    said supporting surfaces, horizontal webs and walls formed and arranged to provide a corrugation at least 3" deep; and at least 7" wide.

3. The corner and bulkhead protector of claim 2 wherein said corner and bulkhead protector is made of high molecular weight high density polyethylene.

* * * * *